US005139748A

United States Patent [19]

Lomas et al.

[11] Patent Number: 5,139,748

[45] Date of Patent: Aug. 18, 1992

[54] FCC RISER WITH TRANSVERSE FEED INJECTION

[75] Inventors: David A. Lomas, Arlington Heights; Edward C. Haun, Glendale Heights, both of Ill.

[73] Assignee: UOP, Des Plaines, Ill.

[21] Appl. No.: 620,582

[22] Filed: Nov. 30, 1990

[51] Int. Cl.$^5$ .......................... F27B 15/08; B01J 8/18

[52] U.S. Cl. .................................. 422/140; 208/153; 208/157; 239/432; 239/520; 239/524; 422/214

[58] Field of Search ................ 422/140, 214; 208/153, 208/157; 239/520, 524, 432

[56] References Cited

U.S. PATENT DOCUMENTS 3,042,196 7/1962 Payton et al. ........................ 208/113
3,071,540 1/1963 McMahon et al. ................ 208/163
3,152,065 10/1964 Sharp et al. ...................... 422/140 X
3,617,497 11/1971 Bryson et al. ......................... 208/80
3,654,140 4/1972 Griffel et al. ....................... 208/113
3,706,654 12/1972 Bryson et al. ......................... 208/74
3,849,291 11/1974 Owen .................................... 208/78
3,894,932 7/1975 Owen .................................... 208/74
4,422,925 12/1983 Williams et al. ...................... 208/75
4,427,537 1/1984 Dean et al. .......................... 208/120
4,427,538 1/1984 Bartholic ............................ 208/127
4,427,539 1/1984 Busch et al. ........................ 208/127
4,434,049 2/1984 Dean et al. .......................... 208/153
4,453,670 6/1984 Sirovy .............................. 239/432 X
4,479,870 10/1984 Hammershaimb et al. ........ 208/164
4,717,467 1/1988 Haddad et al. ...................... 208/113
4,883,583 11/1989 Mauléon et al. ................ 422/140 X

*Primary Examiner*—Lynn M. Kummert
*Assistant Examiner*—Amalia L. Santiago
*Attorney, Agent, or Firm*—Thomas K. McBride; John G. Tolomei

[57] ABSTRACT

Hydrocarbon feedstock is dispersed in an FCC riser by directing jets of atomized feed droplets into a flowing stream of catalyst particles in a direction substantially perpendicular to the axis of the riser. By directing the feed into the riser in a substantially perpendicular direction feed is more quickly dispersed across the entire cross section of the riser. By quickly dispersing feed the mixture of hydrocarbons and catalyst particles is completely mixed after traveling only a short distance along the riser from the point of feed introduction. Reducing this contact zone length improves the quality of riser products by eliminating variations in the contact time between the feed and catalyst. In addition to the short contact zone length this invention also combines the desirable features of catalyst pre-acceleration and feed atomization. The apparatus used for practicing this invention may also include a central strike surface in the riser to prevent erosion of the riser wall from the radially directed feed jets.

10 Claims, 1 Drawing Sheet

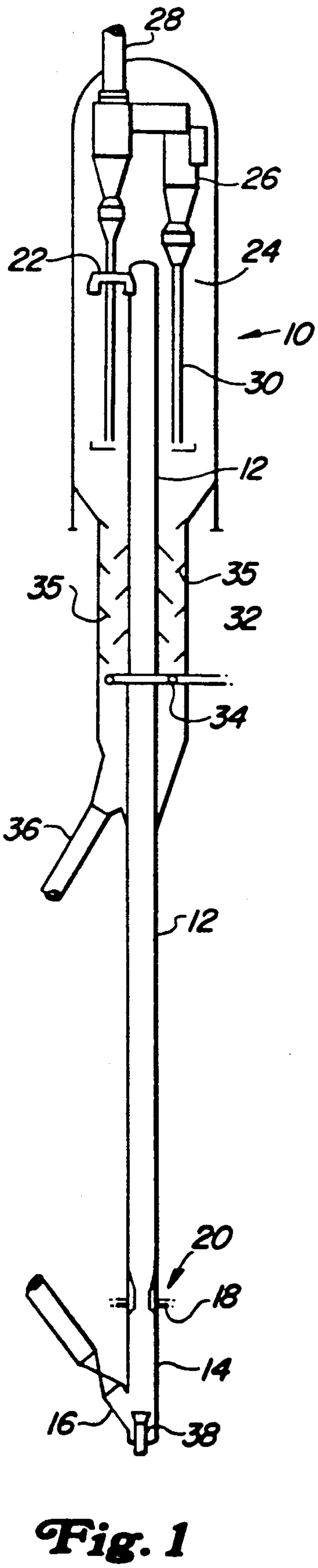
Fig. 1
Fig. 2
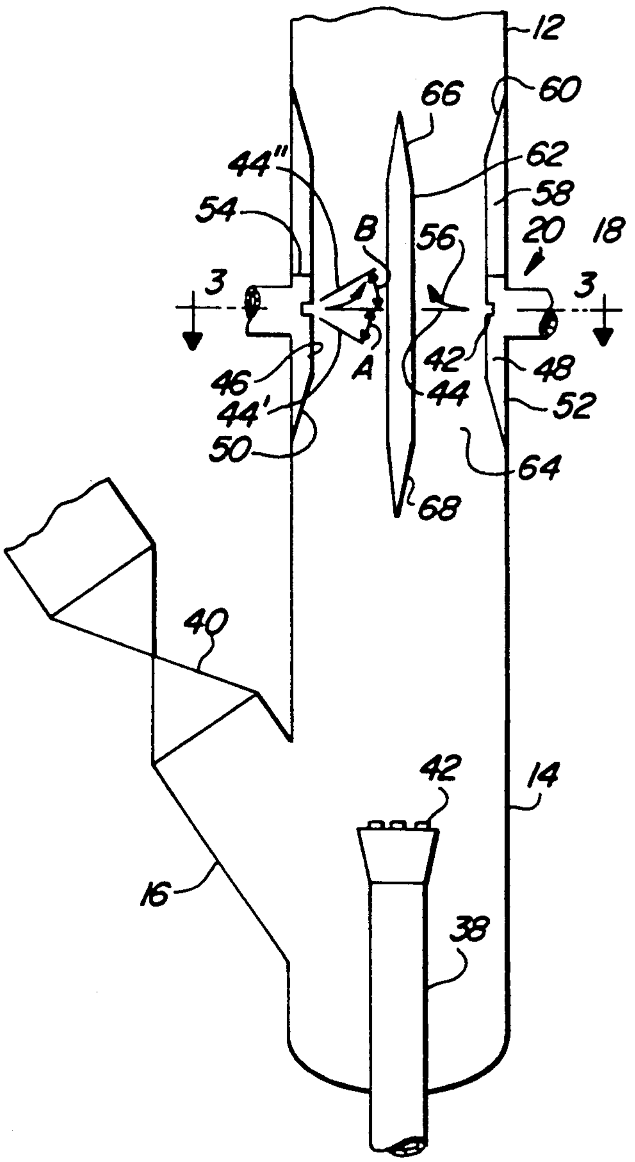
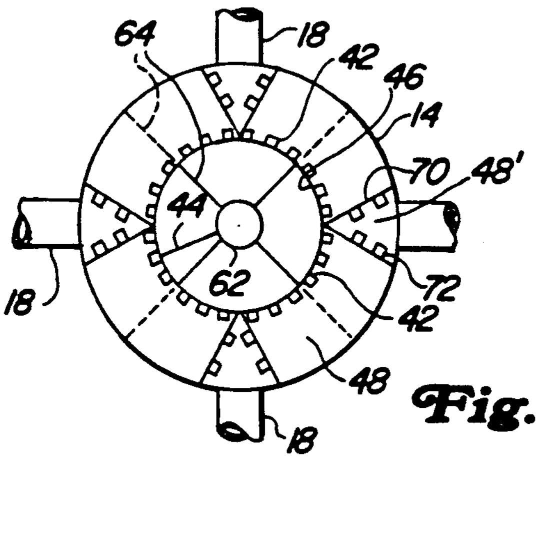
Fig. 3

FCC RISER WITH TRANSVERSE FEED INJECTION

BACKGROUND OF THE INVENTION

1. Field of the Invention

This invention relates generally to the dispersing of liquids into fluidized solids. More specifically this invention relates to a method and apparatus for atomizing liquid into fine droplets and dispersing the droplets into a suspension of fluidized solids. A specific aspect of this invention relates to the contacting of fluidized catalyst particles with a liquid hydrocarbon wherein the liquid hydrocarbon is atomized into a dispersion of fine droplets and injected into the stream of fluidized catalyst particles.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

It has been a long recognized objective in the FCC process to maximize the dispersal of the hydrocarbon feed into the particulate catalyst suspension. Dividing the feed into small droplets improves dispersion of the feed by increasing the interaction between the liquid and solid. Preferably, in hydrocarbon conversion droplet sizes become small enough to permit vaporization of the liquid before it contacts the solids.

It is well known that agitation or shearing can atomize a liquid hydrocarbon feed into fine droplets which are then directed at the fluidized solid particles. A variety of methods are known for shearing such liquid streams into fine droplets.

U.S. Pat. No. 3,071,540 discloses a feed injection apparatus for a fluid catalytic cracking unit wherein a high velocity stream of gas, in this case steam, converges around the stream of oil upstream of an orifice through which the mixture of steam and oil is discharged. Initial impact of the steam with the oil stream and subsequent discharge through the orifice atomizes the liquid oil into a dispersion of fine droplets which contact a stream of coaxially flowing catalyst particles.

U.S. Pat. No. 4,434,049 shows a device for injecting a fine dispersion of oil droplets into a fluidized catalyst stream wherein the oil is first discharged through an orifice onto an impact surface located within a mixing tube. The mixing tube delivers a cross flow of steam which simultaneously contacts the liquid. The combined flow of oil and steam exits the conduit through an orifice which atomizes the feed into a dispersion of fine droplets and directs the dispersion into a stream of flowing catalyst particles.

The injection devices of the '540 and '049 patents rely on relatively high fluid velocities and pressure drops to achieve atomization of the oil into fine droplets. Providing this higher pressure drop burdens the design and increases the cost of equipment such as pumps and exchangers that are typically used to supply liquid and gas to the feed injection device. The need to replace such equipment may greatly increase the cost of retrofitting an existing liquid-solid contacting installation with such an injection apparatus.

Other methods for atomizing liquid feeds with gaseous material are shown in U.S. Pat. Nos. 3,152,065 and 3,654,140. FIG. 2 of U.S. Pat. No. 3,654,140 shows an injection device that imparts a tangential velocity to an oil stream to promote its mixing with a stream of steam which is injected into the oil outside the injection device. In U.S. Pat. No. 3,152,065 an injection device adds a tangential velocity to an annular stream of oil that flows around a central conduit. Steam passing through the center conduit contacts the oil at the distal end of the injector. Steam and oil then pass through an orifice which further atomizes the oil and distributes it into a dispersion of fine droplets. In these devices, the tangential velocity of oil in combination with the expansion of the steam is relied on to provide the energy for atomizing the oil.

U.S. Pat. No. 4,717,467 shows a method for injecting an FCC feed into an FCC riser from a plurality of discharge points. The discharge points in the '467 patent do not radially discharge the feed mixture into the riser.

Another useful feature for dispersing feed in FCC units is the use of a lift gas to pre-accelerate the catalyst particles before contact with the feed. Modern FCC units use a pipe reactor in the form of a large, usually vertical, riser in which a gaseous medium upwardly transports the catalyst in a fluidized state. Catalyst particles first enter the riser with zero velocity in the ultimate direction of riser flow. Initiating or changing the direction of particle flow creates turbulent conditions at the bottom of the riser. When feed is introduced into the bottom of the riser the turbulence can cause maldistribution and variations in the contact time between the catalyst and the feed. In order to obtain a more uniform dispersion, the catalyst particles are first contacted with a lift gas to initiate upward movement of the catalyst. The lift gas creates a catalyst pre-acceleration zone that moves the catalyst along the riser before it contacts the feed. After the catalyst is moving up the riser it is contacted with the feed by injecting the feed into a downstream section of the riser. Injecting the feed into a flowing stream of catalyst avoids the turbulence and backmixing of particles and feed that occurs when the feed contacts the catalyst in the bottom of the riser. A good example of the use of lift gas in an FCC riser can be found in U.S. Pat. No. 4,479,870 issued to Hammershaimb and Lomas.

The addition of lift gas to initially accelerate the catalyst can also be used for a variety of purposes such as treating the catalyst particles prior to contact with the feed and varying the residence time of the feed in the riser. There are many references which teach, for various reasons, the mixing of hot regenerated FCC catalyst with various relatively light materials prior to contact of the catalyst with the FCC feedstock. Thus, in U.S. Pat. No. 3,042,196 to Payton et al. beginning with a light cycle oil, progressively heavier components are added to an upflowing catalyst stream in a reactor riser so as to use a single catalyst and a single cracking zone to convert the elements of a crude oil. In U.S. Pat. No.

3,617,497 to Bryson et al. a light gas oil is mixed with a diluent vapor such as methane or ethylene at or near the bottom of a reactor riser with hot regenerated catalyst, introduced at the same point in the riser or very close downstream, with the mixture then contacted with heavy gas oil at the top of the riser so as to enhance gasoline yield. In U.S. Pat. No. 3,706,654 to Bryson et al., naphtha diluent may be added to the bottom of a reactor riser to aid in carrying upwardly into the riser the regenerated catalyst stream. In U.S. Pat. No. 3,849,291 to Owen it is disclosed that a gasiform diluent material comprising $C_4+$ hydrocarbons and particularly $C_5+$ hydrocarbons may be used to form a suspension with freshly regenerated catalyst which suspension is caused to flow through an initial portion of a riser reactor before bringing the hydrocarbon reactant material in contact therewith in a downstream portion of the reactor so as to achieve a very short residence time (1 to 4 seconds) that the hydrocarbon is in contact with the catalyst suspension in the riser reactor (catalyst residence time). U.S. Pat. No. 3,894,932 to Owen discusses contacting the FCC conversion catalyst with a $C_3$-/$C_4$ rich hydrocarbon mixture or an isobutylene rich stream before contact with gas oil boiling range feed material in an initial portion of the riser (catalyst to hydrocarbon weight ratio from 20 to 80) so as to upgrade the $C_3$–$C_4$ material to a higher boiling material. U.S. Pat. No. 4,422,925 to Williams et al. discusses passing a mixture of hydrocarbons, such as ethane, propane, butane, etc., and catalyst up through a riser reactor at an average superficial gas velocity within the range from about 40 to about 60 feet per second (12.2–18.3 meters/sec), with a catalyst to hydrocarbon weight ratio of about 5 to about 10 so as to produce normally gaseous olefins. In U.S. Pat. No. 4,427,537 to Dean et al. there is shown catalyst particles mixed with a fluidizing gas, such as a gaseous hydrocarbon, charged to a bottom portion of a reactor riser to promote or provide for a smooth non-turbulent flow up the riser of a relatively low velocity dense flow of catalyst particles.

There are additional references which show use of a lift gas in non-catalytic systems. For example, in U.S. Pat. No. 4,427,538 to Bartholic, a gas which may be a light hydrocarbon is mixed with an inert solid at the bottom part of a vertical confined conduit and a heavy petroleum fraction is introduced at a point downstream so as to vary the residence time of the petroleum fraction in the conduit. Similarly, in U.S. Pat. No. 4,427,539 to Busch et al., a $C_4$ minus gas is used to accompany particles of little activity up a riser upstream of charged residual oil so as to aid in dispersing the oil.

The use of feed atomization and lift gas, to pre-accelerate catalysts, have been combined in FCC risers to obtain the benefit of a more uniformly dispersed feed across the cross section of a riser reaction zone. While both the catalyst pre-acceleration obtained from lift gas and feed atomization are desirable features for improving feed injection, these features are usually combined in a manner that requires a relatively long contact time before the feed is completely mixed with the catalyst particles. The typical devices for the atomization of the feed will inject the feed into the riser at high velocities typically greater than 30 meters per second. It has been the practice to aim the exit stream from the atomization device in a principally parallel direction to the flow of catalyst particles. Since the catalyst and gas mixture passing by the distribution nozzles has a typical velocity of less than 12 meters per second the feed and catalyst must travel along the riser for a distance called the axial contact length before the feed and catalyst achieve a uniform velocity and thorough mixing. The atomization nozzles are usually positioned with their nozzles near the wall of the riser. Positioning the feed nozzles near the wall of the riser keeps pipe elements out of the central portion of the riser which would introduce turbulence and undo part of the work of the catalyst pre-acceleration zone. Part of the non-uniformity in the mixing over the axial contact zone is the result of feed having to travel from the wall of the riser to the center of the riser. As the length of the axial contact zone is decreased, better initial mixing of the catalyst and feed results. Therefore, it would be highly desirable to have a method and apparatus for contacting FCC catalysts with a hydrocarbon feed that includes the features of catalyst pre-acceleration feed atomization and minimum axial contact zone length.

SUMMARY OF THE INVENTION

It is an object of this invention to provide a method and apparatus for pre-accelerating catalyst particles in an FCC riser and contacting the pre-accelerated catalyst with an atomized feed over the entire cross sectional area of the riser within an axial contact zone of reduced length.

This objective is achieved by the use of a transverse feed injector for contacting an axial flow of catalyst particles with an atomized hydrocarbon feed that is injected through a plurality of nozzles that are aimed into the riser at a target cylinder in a direction substantially perpendicular to the flow of catalyst. More specifically, the regenerated catalyst and a lift gas are used to accelerate the catalyst of a reactor riser in a catalyst pre-acceleration zone. The axial flow of catalyst passes a ring of atomization nozzles that circle the wall of the reactor riser and have orifice openings with radially projecting centerlines. The catalyst nozzles are aimed such that the centerlines are normal to the axis of the riser or within 25° of normal to the axis of the riser. By fully atomizing the feed and directing it transversely across the riser a fog of feed droplets form a feed interface across the riser. The feed interface produces rapid radial dispersion so that nearly all the catalyst at all portions of the riser cross section are simultaneously contacted with the feed. A high degree of atomization of the feed allows rapid vaporization of the feed so that there is a minimum slippage between the catalyst particles and the feed vapors. As a result, the axial contact zone length is short. Concerns over erosion of the riser are overcome by the use of a target cylinder into which the nozzles are aimed. Thus, this invention provides three desired features: catalyst pre-acceleration, feed atomization and a minimum axial contact zone length.

Accordingly in a specific embodiment this invention is an apparatus for contacting a fluidized FCC catalyst with an FCC feedstock. The apparatus includes an elongated riser conduit having an upstream end and a downstream end. Means are provided for adding FCC catalyst to the upstream end of the riser and a nozzle in the upstream end of the riser adds a gaseous medium to the riser for transporting the FCC catalyst along the riser. A circumferential inlet band is located in the riser between the upstream end and the downstream end. A plurality of orifices are spaced symmetrically around the circumferential band of the riser and the orifices have openings that are aimed radially inward toward the centerline of the riser along a centerline having an angle of less than 25 degrees from a plane normal to the centerline of said riser. A target cylinder is coaxially aligned with the riser and extends above and below the center point. Means are provided for communicating the FCC feedstock to the orifices and discharging the feedstock through the orifices with sufficient pressure to atomize the feed.

In a more limited embodiment this invention is an apparatus for contacting an FCC catalyst with an FCC feedstock in a substantially vertical riser conduit having an upper end and a lower end. A regenerator catalyst standpipe is in communication with the lower end of the riser and transfers FCC catalyst to the riser. A fluidizing gas nozzle located in the lower end of the riser passes fluidizing gas into the riser for fluidizing the FCC catalyst and transporting a stream of the FCC catalyst up the riser. An annular feed distribution chamber inside the riser extends circumferentially around and is located between the upper and lower ends of the riser. An inner wall of the chamber borders the stream of FCC catalyst and a circumferential feed inlet band extends around the inner chamber wall. At least two feed conduits communicate with the chamber for suppling FCC feedstock and an atomizing fluid to the chamber. A plurality of baffles are located in the chamber for mixing the feedstock and atomizing fluid. A plurality of discharge nozzles are symmetrically spaced around the circumferential inlet band at a spacing of no more than 75 mm apart. Each discharge nozzle defines an orifice. The orifices have substantially horizontal centerlines that project inwardly toward a center point located along the centerline of the riser. A target cylinder is coaxially aligned with the riser and extends above and below the center point.

Additional objects, embodiments and details of this invention can be obtained from the following detailed description.

BRIEF DESCRIPTION OF THE DRAWINGS

FIG. 1 is a section of elevation of an FCC reactor and riser.

FIG. 2 is an enlarged section of the lower end of the riser shown in FIG. 1.

FIG. 3 is a horizontal section of the riser taken over section 3—3 of FIG. 2.

DETAILED DESCRIPTION OF THE INVENTION

This invention will be described in the context of an FCC process for the catalytic cracking of hydrocarbons by contact with a fluidized catalyst.

In a typical FCC process flow, finely divided regenerated catalyst leaves a regeneration zone and contacts a feedstock in a lower portion of a reactor riser zone. FIG. 1 shows a reactor 10 with a vertical riser 12 and a lower riser portion 14 into which a regenerator standpipe 16 transfers catalyst from the regenerator. Feed enters the riser through a group of feed nozzles 18 and a feed inlet band 20. While the resulting mixture, which has a temperature of from about 200° C. to about 700° C., passes up through the riser, conversion of the feed to lighter products occurs and coke is deposited on the catalyst. The effluent from the riser is discharged from the top of the riser through a disengaging arm 22 into a disengaging space 24 where additional conversion can take place. The hydrocarbon vapors, containing entrained catalyst, are then passed through one or more cyclone separators 26 to separate any spent catalyst from the hydrocarbon vapor stream. The separated hydrocarbon vapor stream is passed from an outlet nozzle 28 into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst from cyclones 26 passes into the lower portion of the disengaging space through dip legs 30 and eventually leaves that zone passing through a stripping zone 32 in which a stripping gas, usually steam, enters a lower portion of zone 32 through a distributor ring 34 and contacts the spent catalyst purging adsorbed and interstitial hydrocarbons from the catalyst. A series of baffles 35 in the stripping zone improves contact between the catalyst and stripping gas. The spent catalyst containing coke leaves the stripping zone through a reactor conduit 36 and passes into a regeneration zone where, in the presence of fresh regeneration gas and at a temperature of from about 620° C. to about 760° C., combustion of coke produces regenerated catalyst and flue gas containing carbon monoxide, carbon dioxide, water, nitrogen and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and as previously mentioned, contacts the feedstock in the reaction zone.

Catalysts that can be used in this process include those known to the art as fluidized catalytic cracking catalysts. Specifically, the high activity crystalline aluminosilicate or zeolite-containing catalysts can be used and are preferred because of their higher resistance to the deactivating effects of high temperatures, exposure to steam, and exposure to metals contained in the feedstock. Zeolites are the most commonly used crystalline aluminosilicates in FCC.

It has been found that the method of contacting the feedstock with the catalyst can dramatically affect the performance of the reaction zone. Ideally the feed is instantaneously dispersed as it enters the riser over the entire cross-section of a stream of catalyst that is moving up the riser. A complete and instantaneous dispersal of feed across the entire cross section of the riser is not possible, but good results have been obtained by injecting a highly atomized feed into a pre-accelerated stream of catalyst particles. However, the dispersing of the feed throughout the catalyst particles takes some time, so that there is some non-uniform contact between the feed and catalyst as previously described in connection with the axial contact zone. Non-uniform contacting of the feed and the catalyst, for the time it is in the axial contact zone, exposes portions of the feed to the catalyst for longer periods of time which can in turn produce overcracking and reduce the quality of reaction products. Therefore, a preferred riser contact zone will include at least the three following features: catalyst pre-acceleration to provide a moving stream of catalyst, feed atomization to provide good dispersion of the feed through the catalyst particles, and a short axial contact zone length to keep a relatively constant contact time between the feed and catalyst.

Catalyst pre-acceleration is provided by injecting a gaseous medium into the bottom of the riser. This gaseous medium is often called lift gas. FIG. 1 shows a gas conduit 38 that is used to inject lift gas into the riser. Contact of the hot catalyst, entering the riser with a lift gas, accelerates the catalyst up the riser in a uniform flow regime that will reduce backmixing at the point of feed addition. Reducing backmixing is important because backmixing varies the residence time of hydrocarbons in the riser. Addition of the lift gas at a velocity of at least 1.8 meters per second is necessary to achieve a satisfactory acceleration of the catalyst. This invention does not require a specific lift gas composition. Steam by itself can serve as a suitable lift gas. However, the lift gas used in this invention is more effective when it includes not more than 10 mol % of $C_3$ and heavier hydrocarbons and is believed to selectively passivate active metal contamination sites on the catalyst to reduce the hydrogen and coke production effects of these sites. Selectively passivating the sites associated with the metals on the catalyst leads to greater selectivity and lower coke and gas yield from a heavy hydrocarbon charge. Steam may be used by itself as a gaseous medium or may be included with the lift gas. In addition to hydrocarbons, other reaction species may be present in the lift gas such as $H_2$, $H_2S$, $N_2$, CO and/or $CO_2$. However, to achieve maximum effect from a lift gas, it is important that appropriate contact conditions are maintained in the lower portion of the riser. A residence time of 0.5 seconds or more is preferred in the lift gas section of the riser, however, where such residence time would unduly lengthen the riser, shorter residence times for the lift gas and catalyst may be used. A weight ratio of catalyst to hydrocarbon in the lift gas of more than 80 is also preferred.

Once the catalyst is accelerated, feed is injected into the moving catalyst steam through a plurality of discharge points or nozzles located in a feed injector apparatus. The nozzles have restricted openings or orifices that divide the feed into small droplets. In order to disperse liquid feed into a dispersion of fine droplets, sufficient energy must be imparted to the liquid in order to break the liquid up into small droplets. The prior art has used an expanding gas or gaseous component such as steam in conjunction with another source of energy in order to break up the liquid. This other source of energy can consist of a high pressure drop for the gas and liquid mixture. In those cases where the gas and liquid are mixed and simultaneously discharged at high velocity, additional energy, usually in the form of pressure drop across a restricted opening, must be supplied to the liquid and gas mixture in order to adequately mix and homogenize the mixture before discharge. The supply of additional energy makes up for inadequate mixing so that a fine and uniform distribution of droplets will still be obtained outside the injector apparatus. It is also known that the pressure drop across a liquid injector can be reduced while still obtaining a good dispersion of fine liquid droplets by blending and homogenizing the liquid and gas sequentially in stages of increased mixing severity. The feed which enters the injection device will usually have a temperature below its initial boiling point but a temperature above the boiling point of the steam or gaseous hydrocarbons that enters the injection device along with the liquid. Whatever the relative composition of the liquid and gaseous components, a minimum quantity of gaseous material at least equal to 0.2 wt. % of the combined liquid and gaseous mixture, is usually commingled with the liquid entering the injection device. As the gaseous medium and liquid, usually steam and hydrocarbons, enter the injector apparatus, they tend to remain segregated. Therefore, this invention may pass the mixture through a mixing device such as one or more baffles to blend the hydrocarbon and steam mixture into a relatively uniform hydrocarbon and steam stream. By substantially uniform, it is meant that any major segregation between the liquid and gaseous component that would tend to deliver more liquid or gaseous medium to one section or another of the injector device is eliminated. This blending is typically mild and normally will add a pressure drop of less than 100 kPag to the system.

The nozzle of the feed injector apparatus includes a restricted opening or orifice that directs the feed radially into the riser so that the feed is sprayed across the flowing stream of catalyst particles. The orifice has a restricted diameter that produces a pressure drop for atomizing the feed as previously described and imparting a velocity to the exiting feed which develops a jet along the axis of the orifice. This jet is aimed across the riser in a direction that is substantially perpendicular to the axis of the riser and the direction of catalyst flow. The jet shoots the feed droplets across the stream of catalyst. The radial velocity of the droplets bring feed droplets into contact with catalyst at the center of the riser at almost the same time as feed droplets that contact the catalyst near the wall of the riser. As a result, the axial contact zone has a very short length. The orifices are spaced closely around a circumferential band of the riser. Close spacing of the orifices increases the coverage of the droplets over the cross section of the riser.

The angle at which the centerlines of the orifices are aimed is an important element of this invention. It is essential that the orifices impart a primarily radial velocity to the exiting feed. For this reason, the centerlines of the orifices make approximately a right angle with the centerline of the riser. It is not necessary that the orifice centerlines be kept completely perpendicular to the centerline of the riser. The centerlines may make an angle of ±25° with a plane perpendicular to the centerline of the riser. But preferably the angle of the orifice centerlines deviate from such plane by an angle of less than 10° and more preferably less than 5°. FIG. 2 illustrates the angular range of the orifice opening centerlines. Angles are measured from a plane normal to the centerline of the riser conduit. Where the riser conduit extends vertically, the plane normal to the riser extends horizontally and is represented by section line 3—3 of FIG. 2. Line 44 represents a typical centerline of the orifice openings and shows the orifice openings aimed perpendicularly to the riser at an angle of 0° from the horizontal plane. Line 44' shows the centerline of the orifice openings aimed downward at an angle A that can vary from 0° to 25° and line 44'' shows the centerline of the orifice openings aimed upward at an angle B that can vary from 0° to 25°. The angle of the orifice centerlines may be angled slightly downward to compensate for the upward velocity of the catalyst so that the interaction of the axial catalyst velocity and the velocity of the radially directed feed form a horizontal interface across the riser where the catalyst initially contacts the feed. The orifice centerlines may also be angled slightly upward to direct radially deflected catalyst against a fixed portion of the riser wall and provide erosion protection as hereinafter explained. The orifice openings are designed to produce a stream of atomized feed droplets having a relatively high velocity of at least 15 meters per second with velocities of 30 meters per second or more being preferred. In order to obtain such velocity, feed passing through the orifice openings will require a pressure drop of at least 130–270 kPag. Higher pressure drops will produce a greater degree of atomization as well as higher velocities for the droplets exiting the orifices. While a greater degree of atomization has been found to be beneficial for purposes of feed dispersion, the higher velocities associated therewith can, in narrow risers, cause erosion of the riser and attrition of the catalyst. Therefore, it is usually desirable to keep the feed velocity below 60 m/s.

The design of the nozzle end or orifice opening also contributes to the effective functioning of this invention. Production of a relatively small spray pattern from the end of the nozzle aids in dispersing feed mixture across the entire transverse cross-section of the reactor riser. Therefore, the ends of the nozzle have a restricted discharge opening in the form of a nozzle or slot that will spray the feed in a narrow pattern. Preferably, the total angle of this pattern in the vertical direction does not exceed 45° and more preferably it does not exceed 20°.

The apparatus for practicing this invention is more fully illustrated in FIG. 2. Regenerated catalyst in an amount regulated by control valve 40 enters the riser 14 through a regenerator standpipe 16 where it is contacted with the lift gas. The lift gas is introduced into the riser through gas conduit 38 having a plurality of nozzles 42 arranged about the top of the conduit to distribute the lift gas into the catalyst. Catalyst is transferred up the riser preferably for a distance equal to at least 4 pipe diameters of the riser before it is contacted with the feed introduced by the feed injection apparatus 20 of this invention.

The feed injection apparatus has a series of nozzles 42 that define orifice openings having centerlines 44 that extend in a direction perpendicular to the centerline of riser 12. Nozzles 42 are positioned in a circumferential band 46 with the discharge end of the nozzles located flush to the surface of circumferential band 46.

Means are provided for distributing fluid to each nozzle 42. In one possible arrangement circumferential band 46 may be formed out of part of the wall of the riser and the means for distributing fluid will include external piping connected to each nozzle. In the embodiment shown in FIG. 2 a chamber 48 distributes fluid to each of nozzles 42. Chamber 48 is defined by circumferential band 46, a frusto-conical reducer 50, a section 52 of the wall of riser 14 and a top plate 54. Nozzles 18 communicate the FCC feed to the chamber 48. Frustoconical reducer 50 decreases the cross sectional area of riser 14 by a small amount to provide the annular volume for chamber 48. Reducer 50 should have a long length to provide a gradual change in riser diameter. Preferably the walls of section 50 will have at least a 1 in 4 slope.

The jets of atomized feed drop produced by nozzles 44 have a potential to create erosion problems on the walls of riser 14. The impact of the feed droplets will impart a momentum to the catalyst particles and deflect the catalyst in a radial direction. If the radially deflected catalyst particles hit the wall of the riser they can rapidly erode the riser. In order to minimize the potential for erosion from radially directed catalyst particles, nozzles 42 are preferably located symmetrically about band 46 so that radial catalyst velocities associated with each of the jets are cancelled out by the radial catalyst velocities created by opposing jets as the centerlines converge at the centerpoint of the riser. In addition, as a stream of catalyst particles contacts the jets of atomized feed droplets, these jets are deflected in the manner approximated by flow lines 56. Because of this upward deflection any radially directed catalyst will strike the wall of riser 14 above centerlines 44. In order to protect the metal wall of the riser from possible erosion, a band of high density abrasion-resistant lining 58 is located on the inside of the riser wall above top plate 54. Compositions and methods for installing abrasion-resistant linings are well known to those skilled in the art of FCC piping designs. The lining will preferably have a thickness of at least 75 mm and will extend axially along the riser wall for a distance equal to at least one riser diameter. The upper end of abrasion-resistant lining band 58 is provided with a long tapered section 60 to again provide a gradual change in the diameter of the riser 14. In many riser designs a high density abrasion-resistant lining having a thickness of 75 to 100 mm is used over the entire interior surface of the riser wall. In these instances a circumferential band of the lining can be left out at the desired location for the feed inlet nozzles in order to provide space for chamber 48. In these cases, there is no need to provide frusto-conical reducer 50 or the gradual taper 60. For further protection against erosion it is also preferred that an abrasion-resistant lining cover the surface of circumferential band 46 that faces the interior of the riser.

As yet further protection against erosion FIG. 2 shows a target cylinder 62 located along the centerline of riser 14. Target cylinder 62 provides a strike surface upon which all of centerlines 44 are directed. Any direct radial impact from the jet of atomized feed droplets or catalyst particles is deflected by target cylinder 62 before it can contact the wall opposite the nozzle. In this manner target cylinder 62 will further prevent erosion of the riser walls by deflecting and dissipating the radial momentum created by nozzles 42. Target cylinder 62 also has the added benefit of increasing the distribution of feed over the transverse section of the riser and further reducing the axial contact zone length. An abrasion-resistant lining covers the exterior surface of target cylinder 62. A group of horizontally extending brackets 64 support target cylinder 62 from the riser wall at a location upstream of nozzles 42. Target cylinder 62 has a top cone 66 and a bottom cone 68 to provide a gradual transition for the changes in flow area created by the addition of target cylinder 62. Again, target cylinder 62 will preferably extend above the centerline of nozzles 42 for a distance equal to at least one diameter of the riser.

A cross sectional view of the preferred arrangement for the apparatus used in this invention is shown in FIG. 3. In order to improve the presentation the width of chamber 68 has been exaggerated in FIG. 3. Four feed nozzles 18 communicate the hydrocarbon feeds to chamber 48. As the feed enters chamber 48 it first passes through a baffle 70. Preferably the feed will contain at least 2 wt. % steam and baffle 70 has a number of mixing nozzles 72 that impose a pressure drop on the feed mixture to mix it with the steam as it passes across baffle 70. Preferably nozzle 72 will impose a pressure drop of at least 100 kPag between nozzle 18 and chamber 48 to promote mixing of the feed and steam. This mixing improves the atomization of the feed when it passes through nozzle 42. Baffles 70 extend axially over the entire length of the chamber so that each baffle 70 defines a sub-volume 48' of annular chamber 48.

Nozzles 42 are closely spaced around band 46 to provide complete coverage of atomized feed over the transverse cross section of the riser. In order to provide this complete coverage the nozzles will preferably be spaced no more than 75 mm apart. This means that for a relatively small FCC riser having an inner diameter of 600 mm there will be at least 24 nozzles spaced around the circumferential band 46. The jet lengths formed by the orifices are directly proportional to the velocity through the orifice and the size of the orifice. Therefore, in order to restrict the jet length it is preferable to use small orifice openings having a diameter of from 6 to 20 mm. Using small orifice openings will in turn increase the number of nozzles. Thus larger risers may use 100 or more nozzles in circumferential band 46.

FIG. 3 also shows that all of the nozzles are directed radially inward toward the centerline of the riser along orifice centerlines 44. In this manner all of the centerlines 44 converge on target cylinder 62 which is supported by support brackets 64.

What is claimed:

1. An apparatus for contacting a fluidized FCC catalyst with an FCC feedstock, said apparatus comprising:

a) an elongated riser conduit having a centerline, an upstream end and a downstream end;

b) means for adding FCC catalyst to said upstream end;

c) a nozzle in said upstream end of said riser conduit for adding a gaseous medium to said riser conduit for transporting said FCC catalyst along said riser conduit;

d) a circumferential feed inlet band located in said riser conduit between said upstream end and said downstream end;

e) a plurality of orifices spaced symmetrically around said circumferential band of said riser conduit, said orifices each having an outlet opening that is aimed radially inward toward the centerline of said riser conduit at an angle less than 25° from a plane normal to the centerline of said riser conduit;

f) means for communicating FCC feedstock to said orifices and discharging the feedstock through said orifices with sufficient pressure drop to atomize the feedstock, and g) a target cylinder occupies a radially central portion of said riser conduit, said target cylinder extends upstream and downstream from the locus of said feed inlet band and said orifices are directed at said target cylinder.

2. The apparatus of claim 1 wherein a band of abrasion-resistant lining is located on the inside surface of said riser conduit starting at the location of said inlet band and extending in a downstream direction for a distance equal to at least a diameter of the riser conduit.

3. The apparatus of claim 1 wherein said inlet band contains at least one orifice for every 25 mm of riser conduit diameter.

4. The apparatus of claim 1 wherein said means for communicating FCC feedstock includes an annular chamber having an outer boundary defined by said riser conduit and an inner boundary defined by said inlet band.

5. The apparatus of claim 4 wherein a plurality of baffles are located inside said annular chamber to mix feedstock and an atomizing fluid.

6. The apparatus of claim 1 wherein said orifices each have a diameter of from 6 to 20 mm.

7. The apparatus of claim 1 wherein said inlet band is located downstream of said nozzle by a distance equal to at least one riser conduit diameter.

8. The apparatus of claim 1 wherein each of said orifices is constructed and arranged to produce a spray pattern having a total angle of less than 20°.

9. An apparatus for contacting an FCC catalyst with an FCC feedstock, said apparatus comprising:

a) a substantially vertical riser conduit having an upper end and a lower end;

b) a regenerator catalyst standpipe in communication with said lower end of said riser conduit for transferring said FCC catalyst to said riser conduit;

c) a fluidizing gas nozzle located in the lower end of the riser conduit, said nozzle passing a gaseous medium into said riser conduit for fluidizing said FCC catalyst and transporting a stream of said FCC catalyst up said riser conduit;

d) an annular feed distribution chamber inside said riser conduit extending circumferentially around and located between said lower and upper ends of said riser conduit, said chamber having an inner wall that bounds said stream of FCC catalyst;

e) a circumferential feed inlet band defined by said inner wall;

f) at least two feed conduits in communication with said annular distribution chamber for supplying FCC feedstock and an atomizing fluid to said annular distribution chamber;

g) a plurality of baffles in said annular distribution chamber for mixing FCC feedstock and an atomizing fluid in said annular distribution chamber;

h) a plurality of discharge orifices symmetrically spaced about said inlet band in a number sufficient to provide at least one orifice for every 25 mm of riser conduit diameter, said orifices having substantially horizontal centerlines that project inwardly toward a center point located along a centerline of said riser conduit; and i) a target cylinder coaxially aligned with said riser conduit and extending from above to below said center point.

10. The apparatus of claim 9 wherein said orifices are constructed and arranged to have substantially horizontal centerlines which lie in a plane normal to said riser conduit.

* * * * *